(12) United States Patent
Nicholson

(10) Patent No.: US 12,371,851 B2
(45) Date of Patent: Jul. 29, 2025

(54) COUPLING DEVICE

(71) Applicant: RIGGING CONCEPTS LIMITED, Waiheke Island (NZ)

(72) Inventor: Nicholas Jerzy Nicholson, Auckland (NZ)

(73) Assignee: RIGGING CONCEPTS LIMITED, Waiheke Island (NZ)

( * ) Notice: Subject to any disclaimer, the term of this patent is extended or adjusted under 35 U.S.C. 154(b) by 474 days.

(21) Appl. No.: 17/616,959

(22) PCT Filed: Jun. 5, 2020

(86) PCT No.: PCT/IB2020/055290
§ 371 (c)(1),
(2) Date: Dec. 6, 2021

(87) PCT Pub. No.: WO2020/245771
PCT Pub. Date: Dec. 10, 2020

(65) Prior Publication Data
US 2022/0307196 A1    Sep. 29, 2022

(30) Foreign Application Priority Data

Jun. 6, 2019 (NZ) ..................................... 754338
Dec. 2, 2019 (NZ) ..................................... 759776

(51) Int. Cl.
*D07B 1/02* (2006.01)
*D04C 1/12* (2006.01)
*F16G 11/10* (2006.01)

(52) U.S. Cl.
CPC ............. *D07B 1/02* (2013.01); *D04C 1/12* (2013.01); *F16G 11/103* (2013.01); *D07B 2201/1096* (2013.01); *D07B 2201/209* (2013.01); *D07B 2205/205* (2013.01)

(58) Field of Classification Search
None
See application file for complete search history.

(56) References Cited

U.S. PATENT DOCUMENTS

| | | | |
|---|---|---|---|
| 1,793,419 A | 2/1931 | Seger | |
| 4,158,250 A * | 6/1979 | Ringwald | ............... F16L 3/233 206/805 |
| 4,255,836 A | 3/1981 | Dunahoo | |

(Continued)

FOREIGN PATENT DOCUMENTS

| WO | 2007071310 A1 | 6/2007 |
|---|---|---|
| WO | 2011138610 A2 | 11/2011 |
| WO | 2016073974 A1 | 5/2016 |

OTHER PUBLICATIONS

International Search Report, Written Opinion of International Searching Authority, and International Preliminary Report on Patentability for International Application No. PCT/IB2020/055290.

*Primary Examiner* — Jocelyn Bravo
(74) *Attorney, Agent, or Firm* — JCIP; Joseph G. Chu

(57) ABSTRACT

A coupling device comprising a flexible elongate member of at least one length of an at least twice wound rope and a pin configured to be removably engaged with the flexible elongate member, wherein the flexible elongate member is formed as a loop or a part loop completing the loop with the pin, wherein at least one winding of rope is of disparate length to at least one other winding.

14 Claims, 14 Drawing Sheets

(56) References Cited

U.S. PATENT DOCUMENTS

| | | | |
|---|---|---|---|
| 4,850,629 A | 7/1989 | St. Germain | |
| 5,199,135 A * | 4/1993 | Gold | B65D 63/18 |
| | | | 24/17 AP |
| 5,715,578 A * | 2/1998 | Knudson | B65D 63/10 |
| | | | 24/17 AP |
| 2003/0041417 A1* | 3/2003 | Smith | F16L 3/233 |
| | | | 24/16 R |
| 2008/0141506 A1* | 6/2008 | Langtry | A44B 11/10 |
| | | | 24/614 |
| 2013/0139741 A1 | 6/2013 | Fields | |
| 2013/0247534 A1* | 9/2013 | Canedo Duarte da Rocha | |
| | | | D07B 5/00 |
| | | | 57/220 |
| 2017/0108081 A1* | 4/2017 | Laurant | F16G 11/046 |
| 2017/0145631 A1* | 5/2017 | Rommel | D03D 1/0043 |
| 2019/0093819 A1* | 3/2019 | Muller | F16G 11/00 |
| 2021/0079978 A1* | 3/2021 | Kraus | F16G 11/14 |

\* cited by examiner

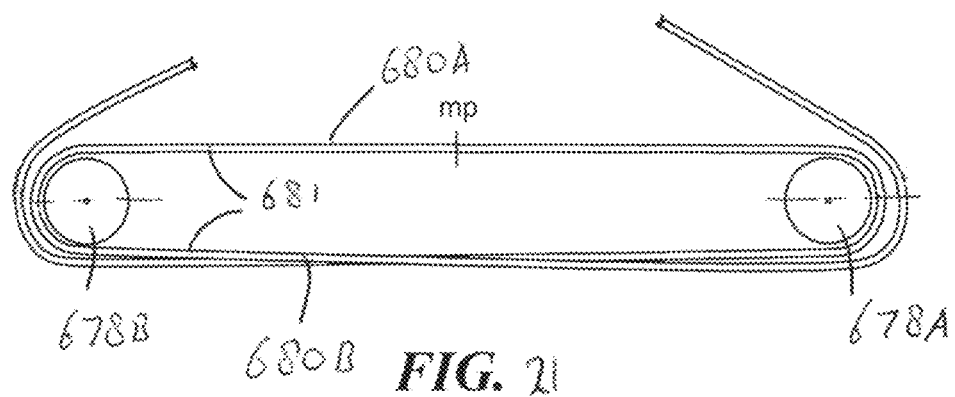
FIG. 21
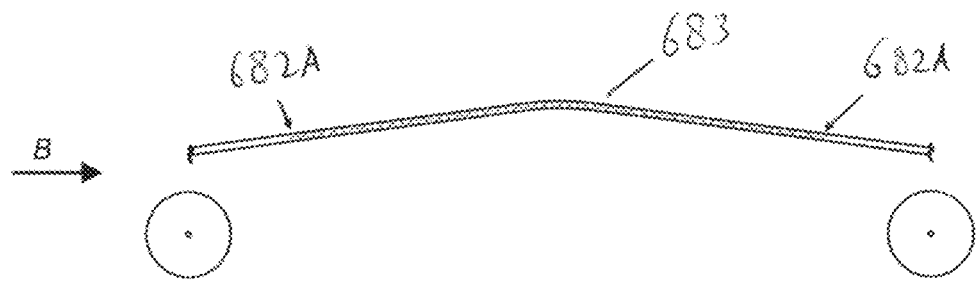
FIG. 22
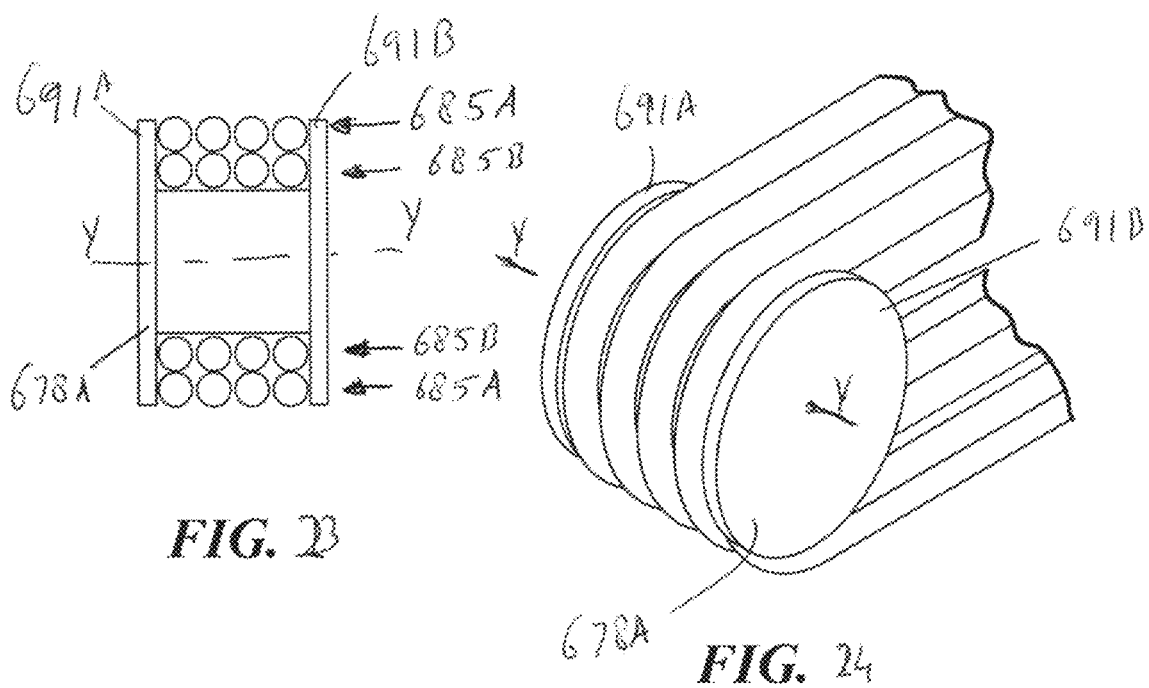
FIG. 23
FIG. 24

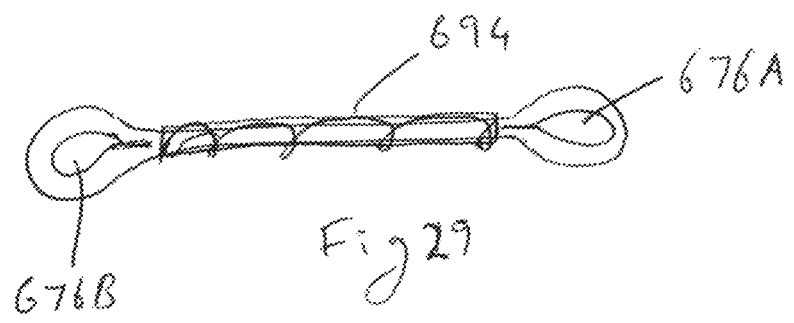

COUPLING DEVICE

The present invention relates to a coupling device. More particularly but not exclusively it relates to a coupling device for lifting, towing, slinging, securing loads, pulling such as during diving, vehicle recovery operations and/or other purposes.

BACKGROUND OF THE INVENTION

Coupling devices such as shackles are typically made from steel or other suitable metal. They are commonly used for lifting in the marine, construction and other similar industries for lifting, towing, slinging, securing loads, pulling and vehicle recovery operations and other purposes.

However, such coupling devices can be very heavy and bulky especially if they are designed to be used in heavy load situations where they need to be strong. Consequently, such coupling devices are generally difficult or impossible to be manually lifted and deployed by a single person. Some coupling devices (e.g. steel shackles) for example may weigh over 50 kg. Multiple persons and additional equipment for lifting and deployment of heavy couplings safely may be required. This may not be possible or commercially desirable or for personal safety reasons. Further, the heavy weight and bulkiness of steel shackles means that they are not easy to store.

Compromising on the strength of a coupling device to reduce weight and provide for less bulky coupling is not a desirable solution because if the coupling device fails, the consequences can be catastrophic.

Metal shackles have a high capacity for stored energy including in a form of elastic yielding of the material of the shackle when under high loading when approaching its break strength. When such a shackle breaks under load, that stored energy is often dissipated in a catastrophic manner. Parts of a metal shackle breaking under load can become projectiles that can cause significant damage and even personal injury. The parts that a breaking shackle is coupled to can also be a danger to property and persons nearby.

OBJECT OF THE INVENTION

It is an object of the present invention to provide a coupling device that overcomes or at least partially ameliorates some of the abovementioned disadvantages or which at least provides the public with a useful choice.

BRIEF DESCRIPTION OF THE INVENTION

In a first aspect, the present invention may be said to broadly consist a coupling device comprising:
  a pin;
  a flexible elongate member in a loop form or part loop form completing the loop with the pin, secured to the pin to be able to form at least one smaller loop form using the pin, the at least one smaller loop form with the pin being a coupling form of the coupling device;
  wherein the flexible elongate member (a) comprises of at least one length of rope formed to define parallel multiple rope sections of the loop form or part loop form, and (b) is at least in part protectively ensheathed using a cover to protect at least part of the rope sections.

Preferably the flexible elongate member is able to be secured to the pin to be able to form at least one smaller loop form using the pin as a toggle.

Preferably the at least one length of rope comprises at least two lengths of rope Preferably the at least one length of rope consists of one length of rope formed to define parallel multiple rope sections of the length of rope of the elongate member.

Preferably the at least one length of rope is of an Ultra-high molecular weight polyethylene.

Preferably the at least one length of rope is selected from one of Dyneema, Spectra and Technora.

Preferably the loop form or part loop form is of at least 3 parallel rope sections of the least one length of rope.

Preferably the loop form or part loop form is of at least 4 parallel rope sections of the least one length of rope.

Preferably the loop form or part loop form is of at least 6 parallel rope sections of the least one length of rope.

Preferably the loop form or part loop form is of at least 8 parallel rope sections of the least one length of rope.

Preferably at least some of the rope sections are of different to least one other rope section.

Preferably the pin comprises a securement means to secure at least a portion of the flexible elongate member that is in contact with the pin.

Preferably the securement means is in a form of a bracket that is attached to or is integrally formed with the pin.

In one embodiment, the pin is captive to the flexible elongate member but can toggle engage to close to the open loop configuration.

In one embodiment, the flexible elongate member defines pin engaging and capturing eyes (preferably spliced in some way to the eye form).

In one embodiment, the length of rope is not joined to other rope but is preferable spliced at its terminal ends to itself.

Preferably the at least one length of rope is wound into the loop form or part loop form by a plurality of windings of the at least one length of rope.

Preferably the windings are of at least two different sizes.

Preferably least one outer winding and at least one inner winding inwardly of yet abutting and parallel the outer winding.

Preferably the loop form comprises of at least two outer windings and at least two inner windings inwardly of yet abutting and parallel the outer windings.

Preferably the loop form comprises of at least four outer windings and at least four inner windings inwardly of yet abutting and parallel the outer windings.

In one embodiment, the rope wound in a manner to abut itself other along its length as a plurality of windings.

In one embodiment, the length(s) of rope is wound onto itself.

In one embodiment, the length of rope is wound onto itself to present parallel sections of rope.

Preferably the length of rope is wound onto itself to define a plurality of rope windings, wherein there is at least one outer rope winding of a larger length than an inner rope winding.

In a further aspect the present invention may be said to be a coupling device comprising:
  a pin;
  a flexible elongate member comprising of at least two windings of at least one length of rope parallel each other and completing a loop of itself or with said pin and secured to the pin, and formed as or able to selectively form at least one smaller loop form with the pin, the at least one smaller loop form with the pin being a coupling form of the coupling device.

Preferably the at least two windings are of at least one length of rope and parallel each other and completing a loop of itself having a first bight at where the loop is secure to and about the pin and a second bight at where the loop is able to selectively secure to the pin to selectively form the smaller loop with the pin.

Preferably the second bight is able to selectively and releasable secure to the pin to selectively form the smaller loop with the pin.

Preferably there are at least two different sized windings.

Preferably the flexible elongate member comprising of at least two windings of at least one length of rope parallel each other and completing a loop with said pin and secured to the pin, and able to selectively form at least one smaller loop form with the pin acting as a toggle, the at least one smaller loop form with the pin being a coupling form of the coupling device.

Preferably a cover is provided to at least in part protectively covering at least part of the windings.

Preferably the at least two windings of rope are formed from one length of rope.

Preferably the one length of rope is end spliced onto itself.

Preferably the at least one length of rope is formed as at least four windings to define a core of the flexible elongate member comprising four rope sections.

Preferably the at least one length of rope is formed as at least six windings to define a core of the flexible elongate member comprising six rope sections.

Preferably the at least one length of rope is formed as at least eight windings to define a core of the flexible elongate member comprising eight rope sections.

Preferably at least two of said windings are provided inwardly of at least two windings outwardly thereof.

Preferably two windings of rope are in pairs covered at least in part by a cover.

Preferably a cover is provided about a pair of windings of rope at at least one and preferably a plurality of locations.

Preferably a cover is provided about windings of rope in pairs at at least one bight in the smaller loop form.

Preferably a cover is provided about windings of rope in pairs at each bight in the smaller loop form.

Preferably windings of rope covered at least in part by a cover.

Preferably a cover is provided about windings of rope at at least one and preferably a plurality of locations.

Preferably a cover is provided about windings of rope at at least one bight in the smaller loop form.

Preferably a cover is provided about windings of rope at each bight in the smaller loop form.

In a further aspect, the present invention may be said to broadly consist in a method for providing coupling device, the method comprising:
  providing a pin;
  providing a flexible elongate member comprising of at least one length of rope;
  using the flexible member to form a loop, or a part loop completing the loop with the pin;
  forming at least one smaller loop form using the pin as a toggle or the like, the at least one smaller loop form with the pin being a coupling form of the coupling device;
  interweaving and/or splicing each of the at least two ropes with itself and/or another rope or ropes; and
  protectively covering at least, a part (preferably entirely) of the flexible member using a cover (or sleeve) to protect the ropes.

Preferably the coupling device is provided as shackle (a soft shackle or a soft recovery shackle).

In yet a further aspect the present invention may be said to be coupling device comprising:
  a first annular member and a second annular member,
  a flexible elongate member formed from multiple windings of at least one length of rope formed to define a first bight received at a grooved rim of the first annular member and a second bight received at a grooved rim of the second annular member thereby connecting the first and the second annular members, the flexible elongate member comprising of multiple sections of said rope protectively and collectively ensheathed at least partially using a cover;
  a pin in a form of an elongated body extending along a longitudinal axis and having two ends located opposite to each other at each of which said first and second annular member are able to be secured.

Preferably a first annular member has a first pin receiving aperture and a second annular member has a second pin receiving aperture, the first and second pin receiving apertures are both adapted to receive the pin therein, thereby allowing the pin to function as a cross member.

In one embodiment, the first and second pin receiving apertures are co-axially aligned.

In one embodiment, the pin or at least a portion of it is of cylindrical shape with a diameter that is slightly smaller than the diameter of the first and second pin receiving apertures so that the first and second apertures are adapted to both snugly receive the shackle pin therethrough.

In one embodiment, one of the two ends of the pin comprises a head portion, the head portion being rotatable relative to the annular member received thereat.

In one embodiment, the head portion is shaped as a nut (preferably a hexagonal nut).

In yet a further aspect the present invention may be said to be a coupling device comprising a flexible elongate member of at least one length of at least twice wound rope and a pin engaged or configured to be to be removably and/or moveably engaged with the flexible elongate member, wherein the flexible elongate member is formed into a loop or a part loop completing the loop with the pin, wherein at least one winding of rope is of disparate length to at least one other winding.

Preferably the windings are protectively and collectively ensheathed at least partially (preferably entirely) using a cover (or a sleeve).

In one embodiment, each of the rope is of at least one braid interwoven and/or spliced with itself and/or other strands.

In one embodiment, the rope is at least two coextensive lengths of rope.

In one embodiment, the rope is wound onto itself in parallel windings.

In a further aspect, the invention resides in a coupling device that is able to loop through or over an anchor point of machinery to couple to the machinery and apply a force to the machinery, the device comprising a plurality of non-woven, inter-woven or spliced rope at least twice round at different wind lengths through the loop.

In still a further aspect the present invention may be said to be a coupling device that is able to loop through or over an anchor point of machinery to couple to the machinery and apply a force to the machinery, the device comprising formed of formable into a loop windings of at least one length of rope not all of the same size through the loop.

In even a further aspect the present invention may be said to be a coupling device that is able to locate through or over an anchor point of machinery to couple to the machinery at a bight of the coupling device and apply a force to the machinery, the bight of the device comprising a plurality sections of at least one length of rope wound into a loop form and provided at at least two different layers or radii at the bight.

In one embodiment, the coupling device is in a form of a shackle (soft shackle or soft recovery shackle).

In a further aspect, the invention resides in a method of using a coupling device in a form of a shackle as defined in any one of the above statements, the method comprising:

providing coupling device comprising a main piece (i.e. shackle body) and a shackle pin;

attaching the shackle pin to the main piece so that the first and second pin receiving apertures both receive the shackle pin therethrough, thereby allowing the shackle pin to function as a cross member to the main piece (shackle body).

In one embodiment, the method further comprises coupling the shackle body and/or shackle pin to one or more apparatus that is/are to be coupled by the coupling device prior to attaching the shackle pin to the main piece.

In a further aspect the present invention may broadly be said to be a coupling device in a form of a shackle (a soft shackle or a soft recovery shackle) comprising:

two spaced apart annular members each with a grooved rim, the two spaced apart annular members being in a form of a first annular member having a first pin receiving aperture and a second annular member having a second pin receiving aperture; and a loop member that is adapted to be received within a grooved rim of the first and second annular members thereby connecting the first and the second annular members, the loop member being of at least two ropes of similar or disparate length protectively and collectively ensheathed at least partially (preferably entirely) using a cover (or a sleeve);

wherein the shackle further comprises:

a shackle pin in a form of an elongated body extending along a longitudinal axis and having two ends located opposite to each other, the first and second pin receiving apertures are both adapted to receive the shackle pin therethrough, thereby allowing the shackle pin to function as a cross member.

In one embodiment the length of rope is configured into a wound form to define a plurality of rope windings, where in there is at least one outer winding of a larger length than an inner winding.

In one embodiment, the or each of the length of rope comprises multiple strands.

In one embodiment, the or each of the lengths of rope comprises multiple strands to form a braided rope.

In one embodiment, each of the multiple strands comprises plurality of fibres.

In one embodiment, each of the plurality of fibres is made of a thermoplastic polyethylene.

In one embodiment, each of the plurality of fibres is made up of Ultra-high molecular weight polyethylene.

In one embodiment, each of the plurality of fibres is made up of Dyneema.

In one embodiment, each of the plurality of fibres is made up of Spectra.

In one embodiment, each of the plurality of fibres is made up of an aramid, more preferably a para-aramid high performance fibre, even more preferably Technora.

In one embodiment, the coupling device is configured to be used for machinery recovery coupling or coupling components thereof.

Preferably the windings are not all of the same size.

In one embodiment, the coupling device is configured to be used for machinery recovery coupling or coupling components thereof.

In one embodiment, the total weight of the coupling device is less than 20 kg.

In one embodiment, the total weight of the coupling device is less than 15 kg.

In one embodiment, the total weight of the coupling device is less than 10 kg.

In one embodiment, the total weight of the coupling device is 8 kg or approximately 8 kg, more preferably 8.2 kg.

In one embodiment, the total weight of the coupling device is more than 7 kg.

In one embodiment, the flexible elongate member has a total diameter greater than 50 cm.

In one embodiment, the flexible elongate member has a total diameter between 52 cm-62 cm.

In one embodiment, the flexible elongate member has a total diameter of less than 65 cm.

In one embodiment, the at least one length of rope has a total diameter between 10 to 15 cm, more preferably between 13 cm to 15 cm.

In one embodiment, the ropes are of same length.

In one embodiment, at least some of the ropes are of different length.

In one embodiment, the at least one of each winding is of a different length.

In one embodiment, the pin comprises a securement means to secure at least a portion of the flexible elongate member that is in contact with the pin.

In one embodiment, the securement means is in a form of a bracket that is attached to or is integrally formed with the pin.

In one embodiment, the pin is captive to the loop member or part loop member but can toggle engage to close to the or each smaller loop form.

In one embodiment, the flexible elongate member defines pin engaging and capturing eyelets or bights (preferably spliced in some way to the eyelet form).

In one embodiment, the cover (or sleeve) that is made up a reflective material.

In one embodiment, the cover (or sleeve) is made up of an aramid, more preferably a para-aramid high performance fibre, even more preferably Technora.

In one embodiment, when loaded within a load limit, the maximum stretch of the coupling device less than 10 percent (preferably less than 5 percent).

In one embodiment, the coupling device is designed to be loaded to a load limit of at least 20,000 kg.

In one embodiment, the maximum stretch of the coupling device is 20 percent when coupled to a load of more than 100,000 kg.

In one embodiment, the windings of rope are abutting each other along their length.

In one embodiment, the total weight of the coupling device is less than 20 kg.

In one embodiment, the total weight of the coupling device is less than 15 kg.

In one embodiment, the total weight of the coupling device is less than 10 kg.

In one embodiment, the total weight of the coupling device is 8 kg or approximately 8 kg, more preferably 8.2 kg.

In one embodiment, the flexible elongate member has a total diameter greater than 50 cm.

In one embodiment, the flexible elongate member has a total diameter between 52 cm-62 cm.

In one embodiment, the flexible elongate member has a total diameter of less than 65 cm.

In one embodiment, the length(s) of rope has a total diameter between 10 to 15 cm, more preferably between 13 cm to 15 cm.

In one embodiment, the cover (or sleeve) is made up a reflective material.

In one embodiment, the cover (or sleeve) is made up of an aramid, more preferably a para-aramid high performance fibre, even more preferably Technora.

In one embodiment, when loaded within a load limit, the maximum stretch of the coupling device less than 10 percent (preferably less than 5 percent).

In one embodiment, the coupling device is designed to be loaded to a load limit of at least 20,000 kg.

In one embodiment, the coupling device is designed to be loaded to a load limit of at least 180,000 kg.

In one embodiment, the coupling device is designed to be loaded to a load limit of at least 280,000 kg.

In one embodiment, the coupling device is designed to be loaded to a load limit of at least 500,000 kg.

In one embodiment, the coupling device is designed to be loaded to a load limit of less than 600,000 kg.

In one embodiment, the maximum stretch of the coupling device is 20 percent when coupled to a load of more than 100,000 kg.

In one embodiment, the maximum stretch of the coupling device is 19 mm when coupled to a load of 175,000 kg.

In a further aspect the present invention may be said to be a coupling device as substantially herein described with reference to one of more of the accompanying drawings and/or depicted in one or more of the accompanying drawings.

Other aspects of the invention may become apparent from the following description which is given by way of example only and with reference to the accompanying drawings.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations, except where expressly specified to the contrary. It is also to be understood that the specific devices illustrated in the attached drawings and described in the following description are simply exemplary embodiments of the invention. Hence, specific dimensions and other physical characteristics related to the embodiments disclosed herein are not to be considered as limiting.

It is acknowledged that the term "comprise" may, under varying jurisdictions, be attributed with either an exclusive or an inclusive meaning. For the purpose of this specification, and unless otherwise noted, the term 'comprise' shall have an inclusive meaning, allowing for inclusion of not only the listed components or elements, but also other non-specified components or elements. The terms 'comprises' or 'comprised' or 'comprising' have a similar meaning when used in relation to the system or to one or more steps in a method or process.

As used hereinbefore and hereinafter, the term "and/or" means "and" or "or", or both.

As used hereinbefore and hereinafter, "(s)" following a noun means the plural and/or singular forms of the noun.

When used in the claims and unless stated otherwise, the word 'for' is to be interpreted to mean only 'suitable for', and not for example, specifically 'adapted' or 'configured' for the purpose that is stated.

Unless otherwise specifically stated, the word "rope" as used may include both single strand and multiple strands rope where the or each strand is made up of multiple fibres/filaments of non-metallic material(s). The word "ropes" refer to more than one rope.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

BRIEF DESCRIPTION OF THE DRAWINGS

Preferred embodiments of the invention will be described by way of example only and with reference to the drawings, in which:

FIG. 21: is a plan view of part of FIG. 20 with the length of rope having been partially wound.

FIG. 22: is a view of the distal ends of the length of rope having been spliced together to create an endless length of rope in a wound configuration.

FIG. 23: is a view in direction B of the winding drum,

FIG. 24: is a perspective view of a winding drum of the present invention,

FIG. 29: is a view of a flexible elongate member configured for being bent in a configuration as for example seen in FIG. 14 and then for loading onto the annular members.

DETAILED DESCRIPTION OF PREFERRED EMBODIMENTS

The coupling device of the present invention may be suitable for coupling directly or indirectly to at least one apparatus or equipment. The apparatus or equipment may be heavy machinery items, mobile equipment such as a bulldozer, truck or trailer. The apparatus or equipment may used on land, in the ocean or in the air. The coupling device may be used for lifting, lowering, towing, dragging, slinging and securing loads such as but not limited to applications such as vehicle recovery operations and other purposes.

Reference will first be made to FIGS. 1, 3 and 4, 5 and 6 that show one preferred example of a coupling device 100 according one form of the present invention.

Figure 1:
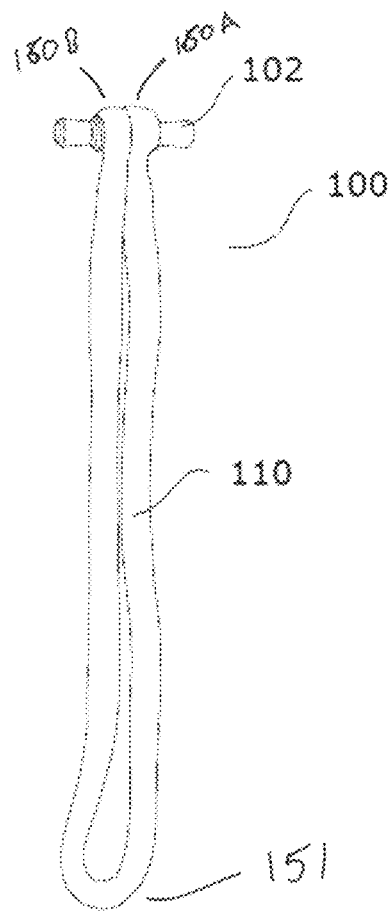
FIG. 1: shows one example of a coupling device, the coupling device being in an open non-coupling configuration.

The coupling device 100 comprises a pin 102 and a flexible elongate member 104. The flexible elongate member 104 is of a form that can create a closed loop configuration with the pin 102 as shown in FIG. 1. The flexible elongate member 104 is preferably able to be at least partially released from the pin to assume an open loop configuration.

Figure 5:
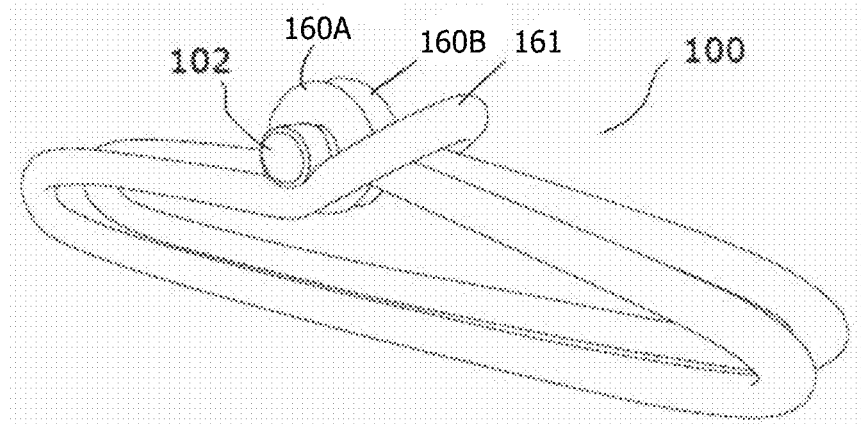
FIG. 5: shows a perspective view of the coupling device of FIG. 1 in a closed loop configuration.

The flexible elongate member 104 preferably comprises of a bendable material such a rope. The flexible elongate member 104 may be configured as an endless loop on its own or together with a pin 102. If the latter of these two configurations, the flexible elongate member 104 may have two ends 160A and 160B. The flexible elongate member is sufficiently bendable, otherwise formed and/or joined to define an eye 106A and 106B at each end 160A and 160B to secure with the pin 102. This can be seen in FIG. 3. Splicing of the rope may be required to create such an endless loop formation of the flexible elongate member 104 with the pin. Such eyes 106A and 106B together with the pin 102 allow a closed coupling condition of the coupling device 100 to be created by hooking the bight 161 of the flexible elongate member over the pin as seen in FIG. 5.

The pin 102 may be of a metallic material(s) such as aluminium, stainless steel, steel, iron etc. However, the pin may equally be made up of suitable non-metallic material such as a carbon composite material.

Figure 2A:
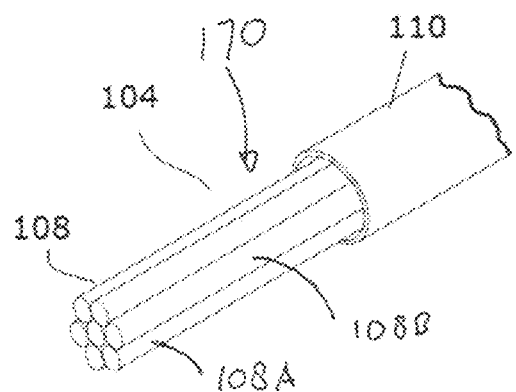
FIG. 2A: shows a partial perspective view of a flexible elongate member of the coupling device of FIG. 1. This figure shows one example of multiple rope sections that are at least partially covered by a cover such as a sheath.
Figure 2B:
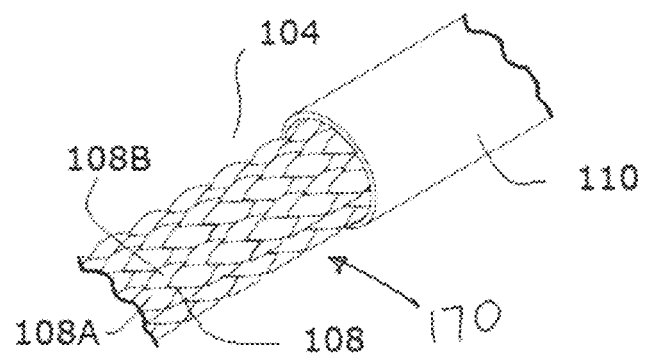
FIG. 2B: shows a partial perspective view of a flexible elongate member of the coupling device of FIG. 1. This figure shows another example of multiple rope sections that are at least partially covered by a cover.

As shown in FIG. 2A and FIG. 2B, the flexible elongate member 104 preferably comprises of at least two sections of rope 108 A,B etc configured in a parallel manner to each other. This multi-rope assembly 170 of said rope 108 may originate from and remain as one or more lengths of rope that may be configured back onto itself as required.

The rope 108 preferably comprises of multiple braids each comprises multiple fibres. The braids may be interwoven and/or spliced with itself and/or other braids. The ends of the rope 108 are preferably spliced onto itself or onto another length of rope of the multi-rope assembly.

The flexible elongate member 104 may comprise of a protective sheath 110 at least partially located about discrete parts or the entire length of the multi-rope assembly 108 as shown in FIGS. 1 to 4.

The sections of rope 108 A,B etc between the eyes are preferably not all of the same length.

In the preferred form the rope is a multi-braided rope. It is preferably of an Ultra-High Molecular Weight Polyethylene (UHMwPE). It is preferably Dyneema® or Spectra®.

In one embodiment the rope is of an aramid, more preferably a para-aramid high performance fibre, even more preferably Technora®.

Use of UHMWPE rope is advantageous because UHMWPE can make the coupling device stronger than steel by weight and also much stronger than Polyester rope of equal weight. Hence, the coupling device 100 can be made strong enough to be suitable for lifting, towing or connecting heavy machineries or equipment yet be light enough to be more easily handled than steel coupling devices or similar strength.

Due to such construction material, the coupling device 100 can be much smaller in volume and weight making the coupling device 100 suitable for easy storage and rapid deployment such as in emergency cases even by an individual person. The total weight of the coupling device may be less than 40 kg. In one embodiment, the total weight of the coupling device may be less than 20 kg, or less than 15 kg, or less than 10 kg. Preferably, the total weight of the coupling device 100 is 8 kg or approximately 8 kg, more preferably 8.2 kg. In one embodiment, the total weight of the coupling device 100 is more than 7 kg.

A coupling for a break strength of 100,000 kg can weigh around 2.1 KG

A coupling for a break strength of 120.00 kg can weigh around 2.3 KG

A coupling for a break strength of 140,000 kg can weigh around 2.7 KG

A coupling for a break strength of 160,000 kg can weigh around 2.9 KG

A coupling for a break strength of 180,000 kg can weigh around 3.1 KG

A coupling for a break strength of 200,000 kg can weigh around 3.3 KG

A coupling for a break strength of 510,000 kg can weigh between 8.5 kG and 19 KG.

The weight of the coupling device 100 is much lighter as compared to total weight of a steel shackle (which typically weigh higher than 60 kg) normally used in heavy industry for similar purposes. The coupling device may be 3 times lighter.

In one embodiment when loaded to a safe load limit, the maximum stretch of the coupling device at failure can be less than 5-10 percent (preferably less than 5 percent). In one embodiment, the coupling device is designed to be loaded to a load limit of at least 20,000 kg. In one embodiment, the maximum stretch of the coupling device is around 5% when coupled to a load of more than 100,000 kg. In on embodiment, the maximum stretch of the coupling device was tested at 19 mm when a load of 175,000 kg is applied.

The coupling device 100 may be configured to be used for machinery recovery coupling or coupling components thereof, preferably in mining industry.

The cover 110 is preferably made up of an aramid, more preferably a para-aramid high performance fibre, even more preferably Technora®. This can provide a high heat resistant/chafe tolerance which can be very useful in high heat environment such as a mining environment.

In one embodiment, the cover 110 may be made up a reflective material so that the coupling device 110 is visible in darkness. This can make the coupling device 100 very useful in mines where the visibility is very minimal.

Figure 3:
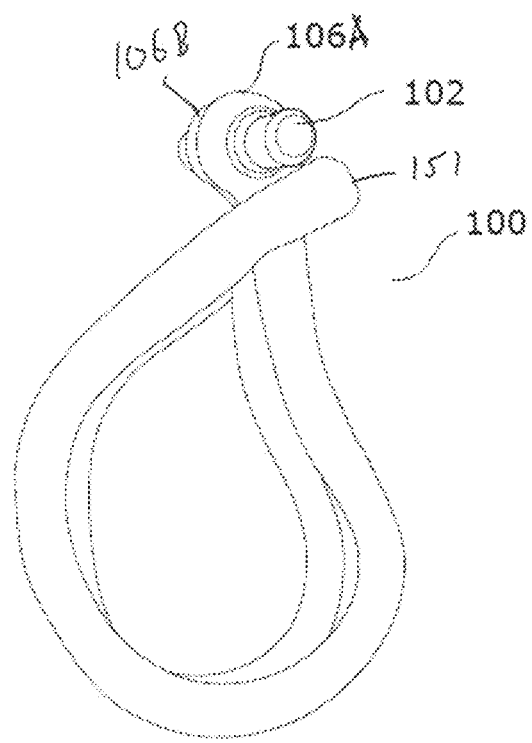
FIG. 3: shows a side elevation view of the coupling device of FIG. 1 in a closed loop configuration.
Figure 4:
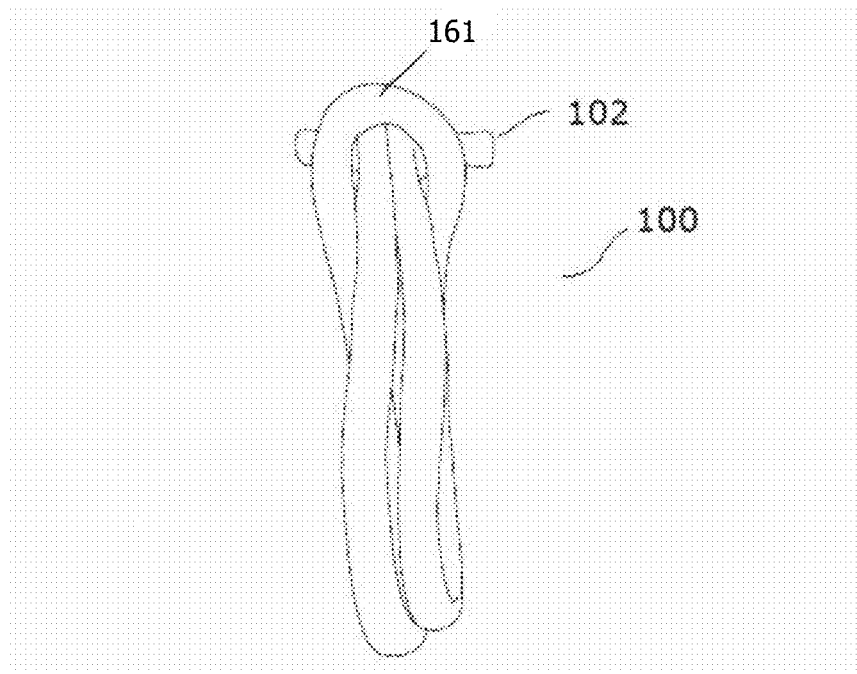
FIG. 4: shows an end view of the coupling device of FIG. 1 in a closed loop configuration and hence in a coupling condition.

As shown in FIGS. 3 to 5, the pin 102 may be captive to the flexible elongate member 104 but can toggle engage to create a closed loop configuration.

Figure 6:
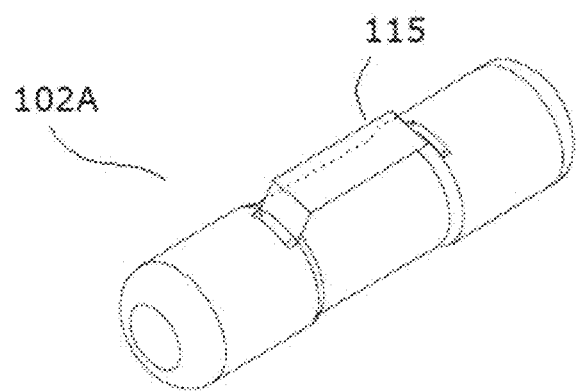
FIG. 6: shows a perspective view of an example of a pin of FIG. 1.
Figure 7:
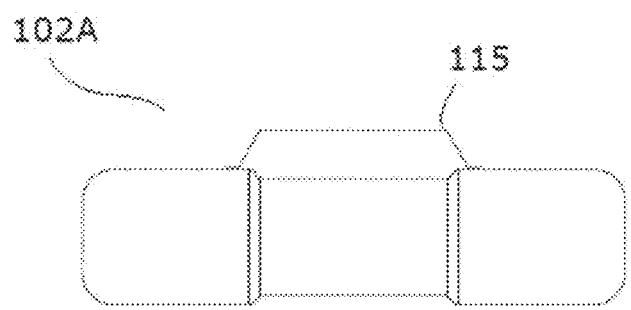
FIG. 7: shows a side view of the pin of FIG. 7.

FIGS. 6 and 7 show another example of a pin 102A. As shown, the pin 115 comprises a securement means in a form of a bracket 115. The bracket 115 may be configured to secure the flexible elongate member at that part that is in contact with the pin during use. The bracket 115 may be attached to or is integrally formed with the pin.

The pin and flexible elongate member can be designed in the preferred form to ensure that at failure of the coupling device, it is the flexible elongate member that fails. Not the pin. It is preferably a tensile failure of the flexible elongate member that causes failure of the coupling device.

Figure 8:
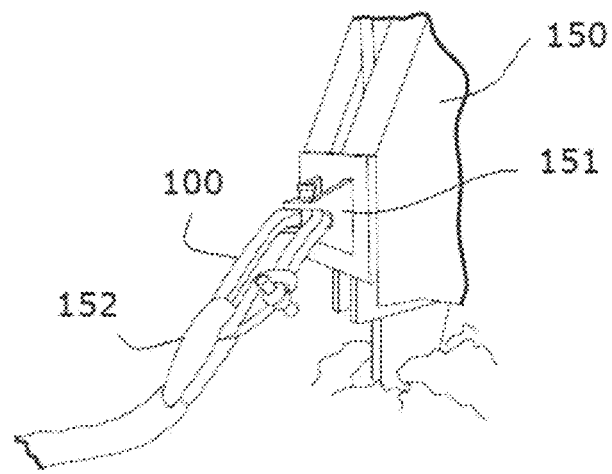
FIG. 8: shows the coupling device of FIG. 1 in use.

FIG. 8 shows as example of a coupling device 100 being used to couple a coupling feature 151 of or attached to one apparatus 150 with a coupling feature 152 or attached to another apparatus not shown. The example shown in FIG. 8 is self-explanatory and need not be described in any further detail. The coupling device can couple the two features 151 and 152 together. This may occur by for example a feeding through of part of the flexible elongate member through one of both of the features.

Figure 9:
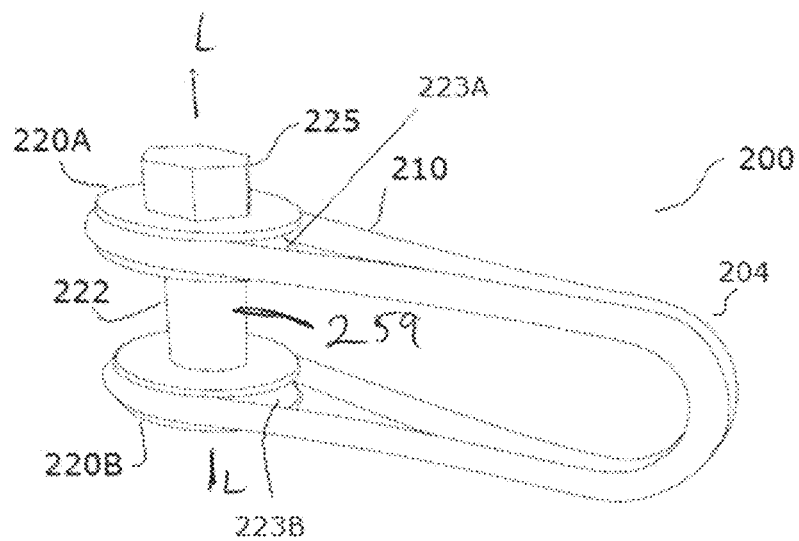
FIG. 9: shows another example of a coupling device according to the present invention.

FIG. 9 shows a coupling device 200 according to another preferred example/embodiment of the present invention. The embodiment of the coupling 200, in its functionality, largely corresponds the embodiment of the coupling device 100 of FIG. 1 as described above. In particular, in FIG. 9, like or identical parts of the coupling device 200 have been given the same reference numeral raised by 200. Thus, it is here mainly referred to the explanations given above and, primarily, only the differences will be discussed in detail.

The coupling device comprises a pin 222. The pin may present two spaced apart annular members of or from a pin member 259, namely a first annular member 220A and a second annular member 220B. Each of the annular members 220A, 220B comprises a grooved rim 223A, 223B. The first annular member 220A may comprise a first pin receiving aperture and a second annular member 220B may comprise a second pin receiving aperture. These apertures allow the annular member(s) to be assembled and taken off the pin member 258 to open the coupling device up.

The coupling device 200 further comprises a flexible elongate member 204. The flexible elongate member may comprise at least two parallel rope sections preferably protectively and collectively ensheathed at least partially using a cover 210. The parallel rope sections are preferably defined from a length of rope. Preferably the rope sections are not all of the same length.

The flexible elongate member preferably is adapted to be received (preferably snugly received) within the grooved rims 223A, 223B of the first and second annular members thereby connecting the first and the second annular members 220A, 220B.

The coupling device 200 may comprise the pin 222 having a pin member 259 extending along a longitudinal axis L-L and having two ends located opposite to each other. The pin member 259 may be configured to be integral with or attached to the annular members so that the first and second pin receiving apertures thereof are both adapted to receive onto the pin member 259 therethrough, thereby functioning as a cross member. The pin 222 may be made out of a metallic material such as but not limited to aluminium, stainless steel, steel, iron etc. Many suitable non-metallic materials may also be used. The diameter and length of the pin can be designs according to standard engineering principles and using well known engineering techniques.

In one configuration, one of the two ends of the pin may comprise of a head portion 225. The head portion may be rotatable relative to the pin member to engage to the pin member and to disengage the pin member.

In one configuration, head portion 225 may be shaped as a nut (preferably a hexagonal nut) as shown in FIG. 9.

In one configuration, the annular members 220A, 220B may be part of the pin member, e.g. integrally formed with the pin member.

From FIG. 9, it can be appreciated that in one embodiment, the coupling device 200 of the present invention may be in the form of a shackle comprising the flexible elongate member and a pin 222 acting as a shackle pin. The shackle may be considered a soft shackle.

Figure 10:
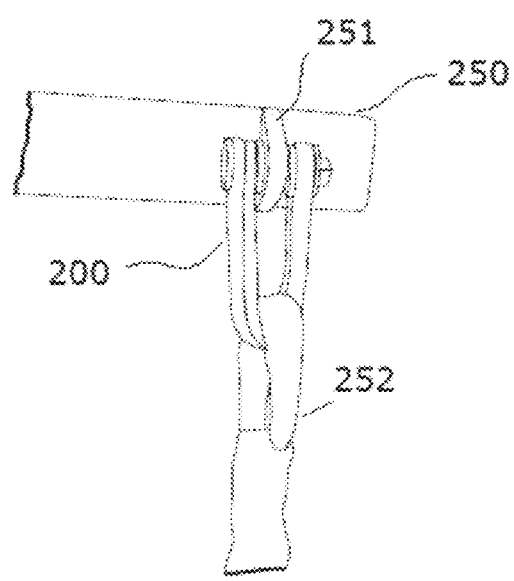
FIG. 10: shows the coupling device of FIG. 9 in use.

The coupling device 200 may be used in a similar way as how conventional all-metal shackles are used. FIG. 10 shows as example of a coupling device 200 being used to couple with an apparatus 250.

The construction details of the flexible elongate member 204 may be same as that of the flexible elongate member 104 describe above or of the flexible elongate member described below. The weight and performance of the coupling device 200 may also be same or similar as described above for coupling device 100.

With reference to FIGS. 12-29 there is shown examples of an alternative form of a coupling device 600. The coupling device 600 comprises of a pin 622 and a flexible elongate member 604. The flexible elongate member 604 comprises of parallel rope sections that are preferably wound from one length of rope. In an alternative form there may be a plurality of lengths of rope that may for example be end-joined (eg spliced) to create a single length. If end-joined the lengths of rope may be of the same kind and size. If end joined the lengths of rope may not be all of the same kind and/or diameter. The lengths of rope to operate at the high stress regions of the coupling may for example be of a larger diameter. This can provide for weight saving to the coupling by allowing lighter rope to be used at regions of lower stress.

Figure 12:
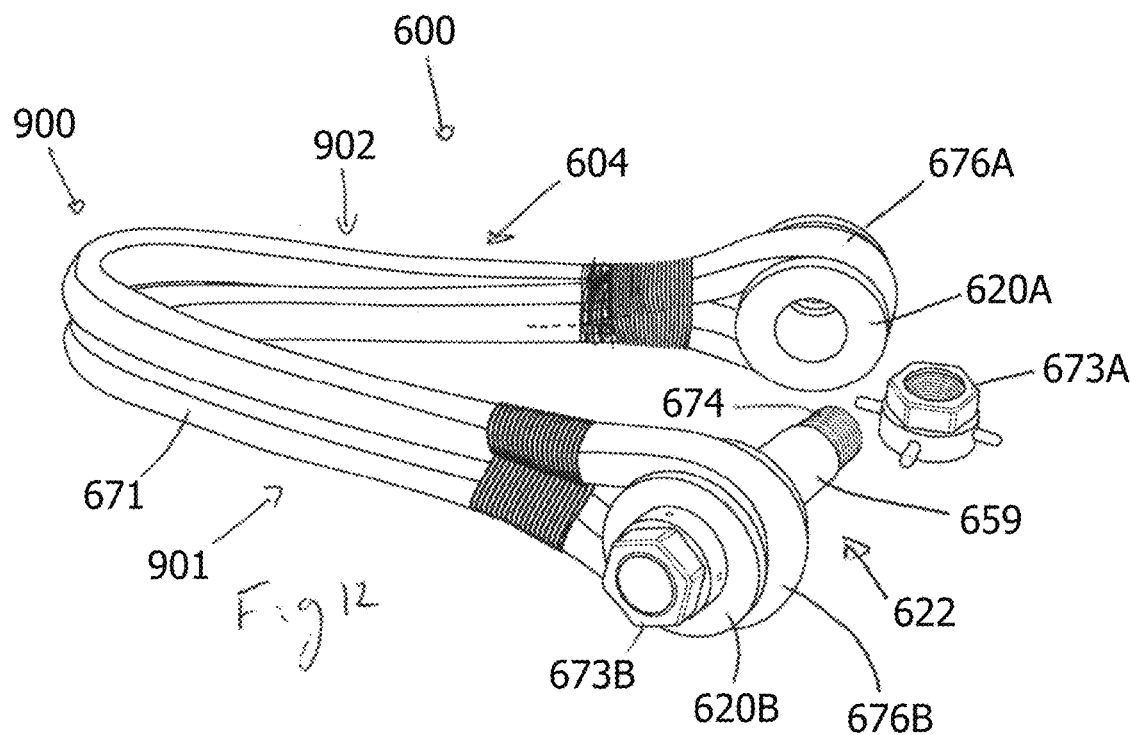
FIG. 12: is a perspective view of a coupling device in an open loop configuration.

The distal ends of the length of rope may be spliced together to create an endless length of rope in a wound configuration that will herein after be described. The endless length of rope may be configured into multiple windings. The parallel rope sections so defined may comprise of two sections 901 and 902 that extend between the bight 900 of the coupling device and the pin 622 as seen in FIG. 12. At the bight 900 the sections of rope of the flexible elongate member are positioned at at least two different radii.

Figure 13:
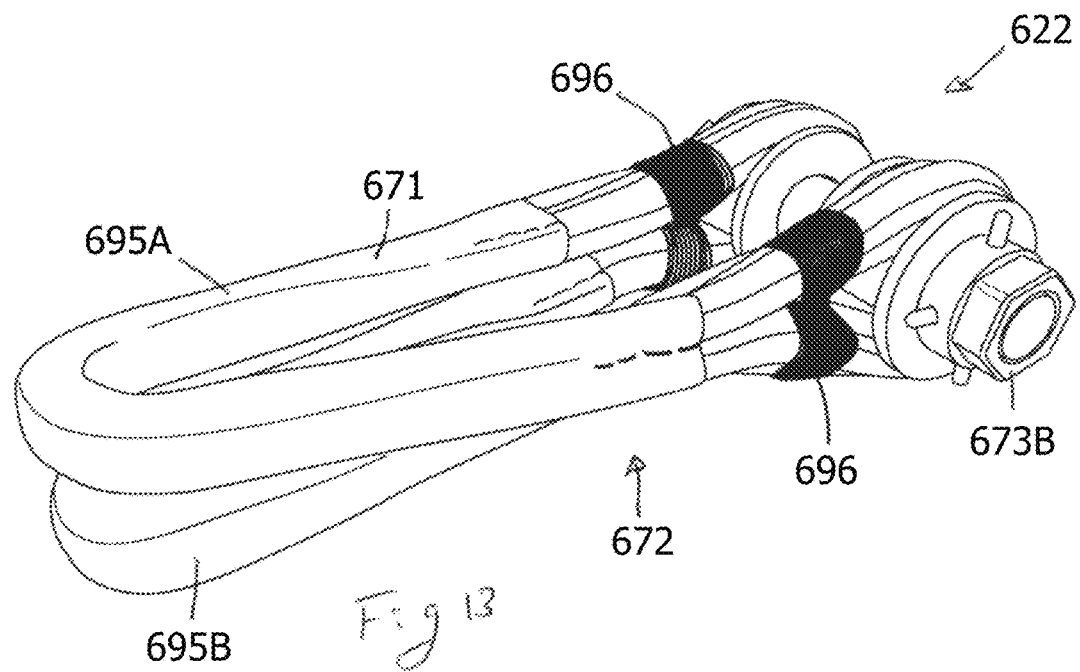
FIG. 13: is a perspective view of coupling device of FIG. 12 in a closed loop configuration.
Figure 14:
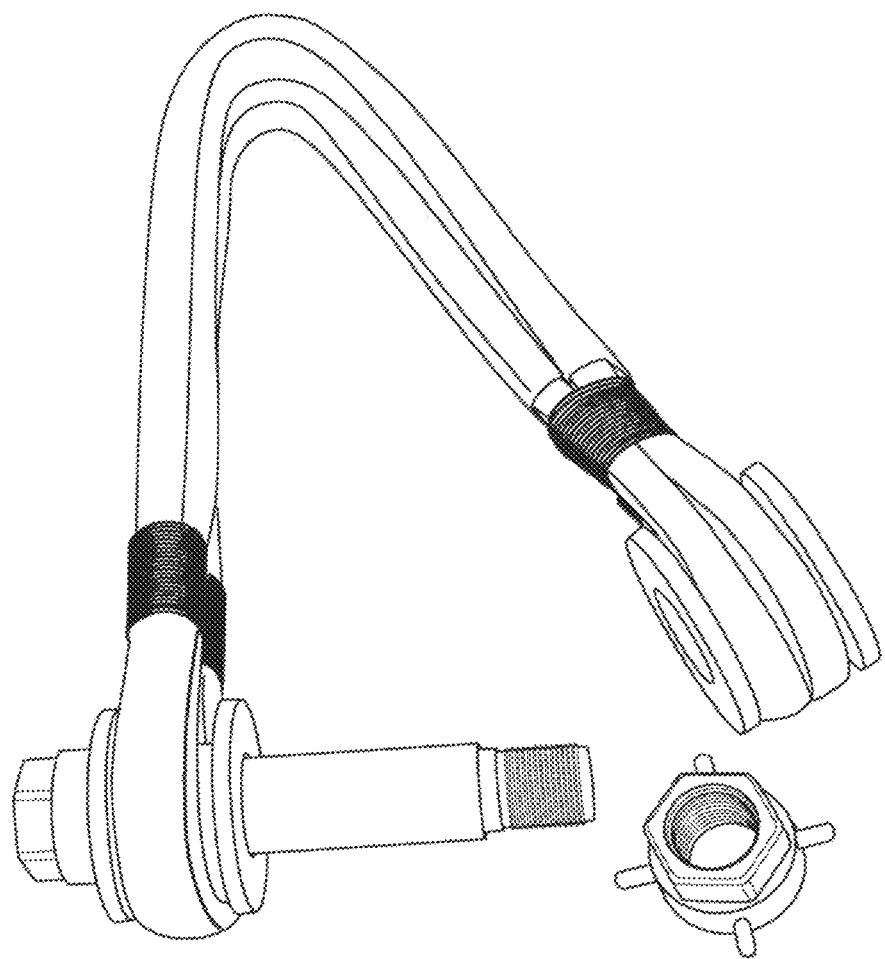
FIG. 14: is an alternative view of the coupling device of FIGS. 12 and 13, FIG. 15: is a front view of a pin of the coupling device of FIG. 14, FIG. 16: is a sectional view of the pin of FIG. 15, FIG. 17: is a perspective view of the pin of FIG. 15, FIG. 18: is a view of a length of rope.
Figure 15:
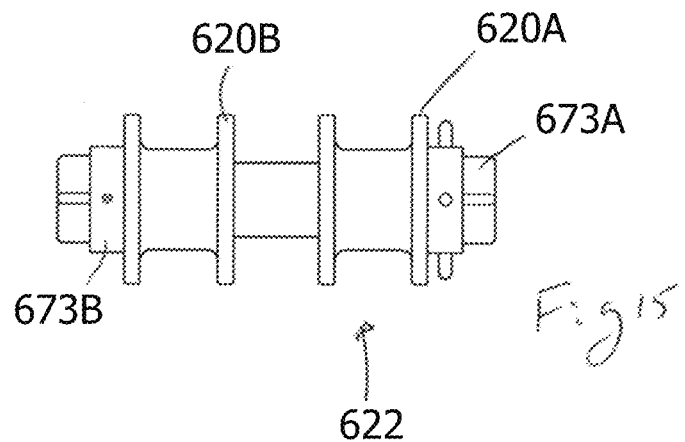
Figure 16:
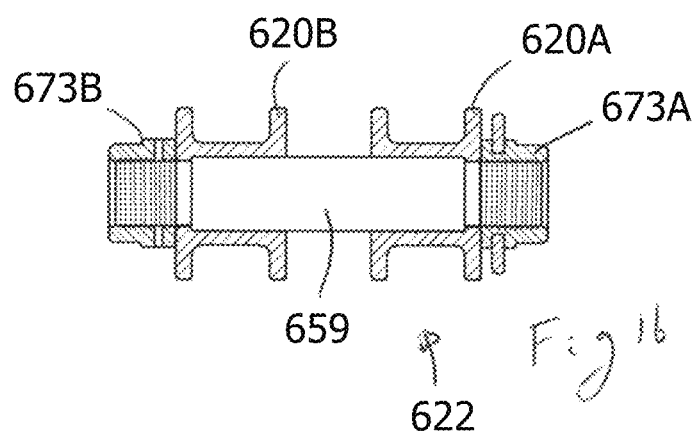
Figure 17:
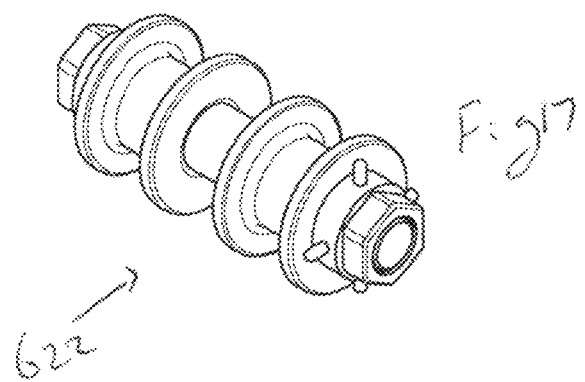
Figure 25:
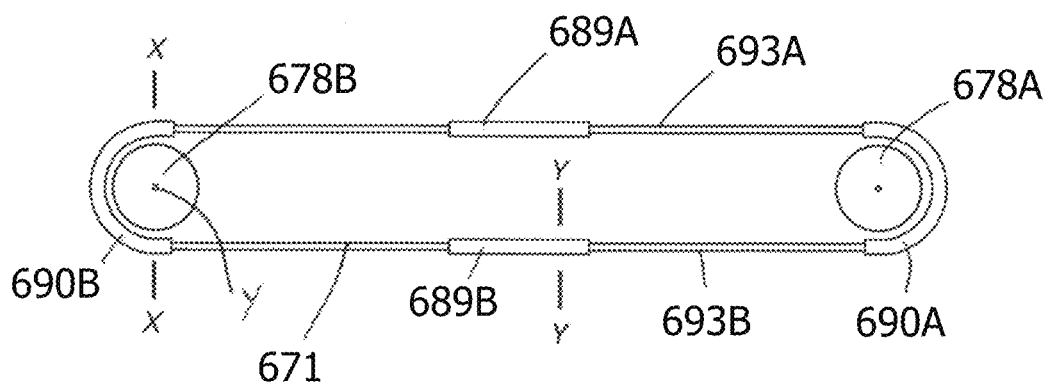
FIG. 25: is a plan view of a flexible elongate member in part assembled.

The loop 671 formed of the endless length of wound rope as seen in FIG. 25 is able to form a closed smaller loop 672, together with the pin 622 to define a coupling form of the device itself as seen in FIG. 13. In this closed loop condition the coupling device can function to couple and transfer forces between two objects.

The pin 622 may comprise of a pin member 659 and a first annular member 620A and 620B secured to the pin member 659 optionally in a releasable manner. Threaded fasteners 673A and 673B may be used for securing the first and second annular members to the pin member. The pin may have threaded ends 674 to receive the threaded fasteners at each end. In some forms only one of the annular members may be removable from the pin member 659. By being so removable, the smaller loop 672 is able to be opened as seen in FIG. 12 yet is able to be closed for use as seen in FIG. 13.

The loop 671 is able to form two eyes or bights 676A and 676B that are able to locate about the first annular member 620A and second annular member 620B respectively. The first bight 676B may be permanently or releasable secured or securable with the pin. The second bight 676A may be releasable secured or securable with the pin so that the smaller loop form 671 is able to assume an open condition if and when desired. Alternatively the smaller loop form may be permanently closed for use.

A method of making the coupling device 600 will now be described with reference to FIGS. 18-29.

Figure 18:
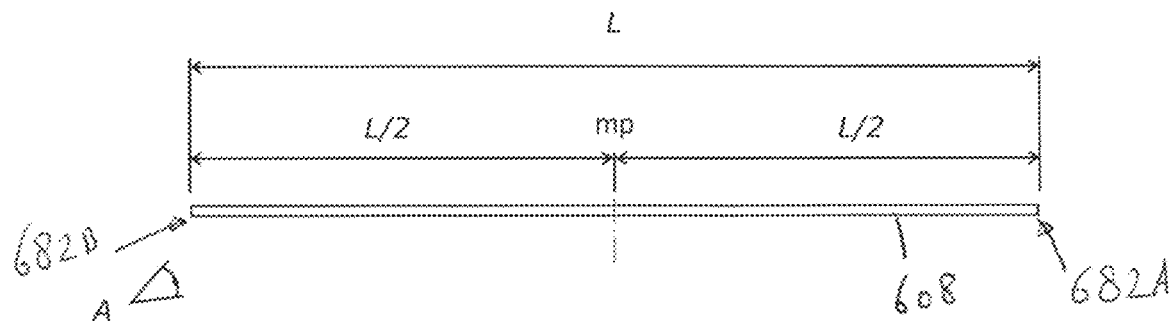
Figure 19:
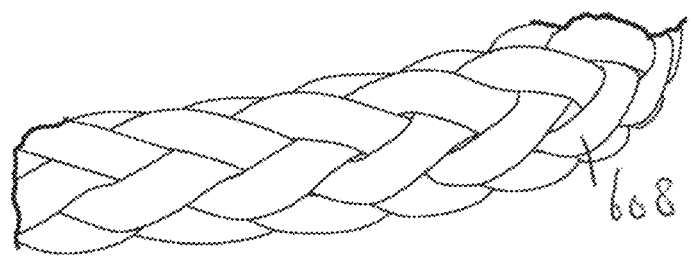
FIG. 19: is a close-up view of view A of FIG. 18, FIG. 20: is a perspective view of equipment used for creating the flexible elongate member using the rope of FIG. 18.
Figure 20:

In FIG. 18 there is shown a rope 608 of length 'L'. The rope is preferably a braided rope as seen in FIG. 9 when viewed in direction A. The rope is preferably a double braided rope of a UHMW such as Dyneema® or Spectra.

The single length of rope is preferably a continuous single length of rope or may alternatively comprise of a plurality of shorter lengths of rope that are spliced together to define the length 'L'.

The length of rope 608 is able to be wound. This may be in a manner to define the core of several sections of rope of the flexible elongate member. The rope is able to be wound to define an endless length of wound rope as seen in FIG. 25 using two spaced apart winding posts 678A and 678B. These present cylindrical surfaces with axes parallel each other for the rope to bend around. The winding posts may be placed above a table 679. The winding posts can move relative each other. Preferably the first winding post 678A is secured to the table and the second winding post 678B is able to move to and away from the first winding post 678A so as to create a tension force in the rope that will hereinafter be described.

To create the endless length of wound rope, the mid-point 'MP' is desirably found and this is placed midway between a first winding post 678A and second winding post 678B. Placing the mid-point MP of the rope midway between the winding posts 678A and 678B the length of rope is then able to be wound around the winding posts as seen in FIG. 10 to create a first section 680A of rope of a first winding of the rope. The second section of the first winding 680B continues around each winding post and the rope is so mound into multiple windings.

When the desired and predetermined number of windings of the rope are created the distal ends 682A and 682B of the length of rope 608 are able to be end spliced. The splicing is seen in FIG. 22 where the spliced section 683 is of the rope inwardly of the end 682A and 682B respectively. Such splicing creates the endless length of rope with multiple windings defining a plurality of parallel sections of rope. In the example shown there 8 windings of the rope. Once the windings are established around the winding posts, preferably in a loose manner, the windings are able to be configured so that at each winding posts multiple layers of windings are established. In the example shown, two layers of windings are established, namely a first layer 685A and a second layer 685B. This results in different lengths of sections of rope between the winding posts. At this stage the windings may be configured, still in a relatively loose fashion, in a layered manner.

In a preferred form during the creation of the windings of the length of rope, covers or sheaths are used for covering parts of the sections of rope. Sheaths 689A and 689B may be located over the sections of rope at or about the midpoint between the winding posts 678A and 678B. In the end form of the coupler these sheathes preferably locate at the bight 900. In addition, sheaths 690A and 690B may be used about sections of the rope turning about the winding posts 678A and 678B. In the end form of the coupler, these sheaths are located at the eyes of the flexible elongate member.

Figure 26:
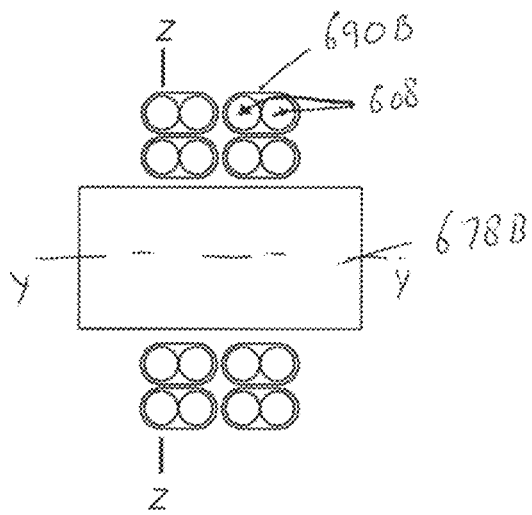
FIG. 26: is a view of the winding drum on the left side of FIG. 25.
Figure 27:
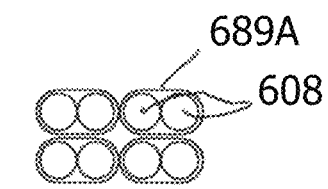
FIG. 27: is a view at section YY of FIG. 25.
Figure 28:
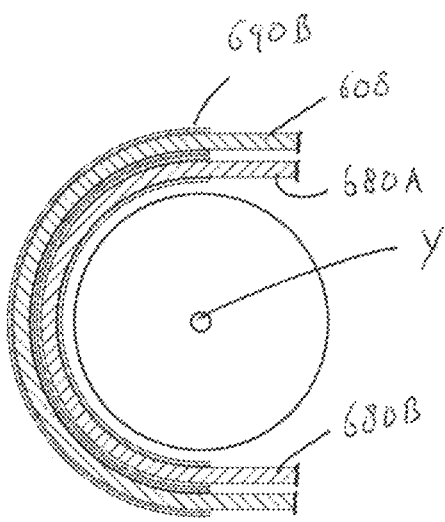
FIG. 28: is a view at section ZZ of FIG. 26.

In a preferred form as can be seen in FIGS. 26 and 27 the rope sections at each winding post are sheathed in pairs. A first of a sheath 690B preferably locates two sections of the rope 608 and additional such sheaths 690B allocate about other pairs of ropes as seen in FIG. 26. Likewise, at the intermediate location a plurality of sheaths 689A and 689B locate about two sections of rope thereat. The sheathing is provided about rope sections in a relative snug manner. The sheathing may be of the same material as the rope braided as a tube form.

Such sheathing helps maintain the windings of rope in a layered fashion before and during use. The sheathing helps prevent the sections of rope, once tension is applied, from trying to reconfigure into a single layer about the winding posts. The layered arrangement of the rope is preferably maintained at each of the annual members and also at the bight of the loop in the final form of the coupling device. The shape and configuration of the annular members can help facilitate this. The annular members preferably have lateral flanges that so help keep the layered configuration of ropes thereat.

Flanges 691A and 691B of the winding posts also help with retention of the layered configuration of the windings of rope around the winding posts during the connector construction process. The flanges help prevent these sections of rope moving towards a single layer configuration once tension is applied to the windings. Once the layers are established a force in direction 'F' is able to be applied by moving of second winding posts 678B way from the first winding post 678A thereby establishing tension in each of the sections of the rope. The application of such tension causes the rope strands and the braids to become more parallel to each other. The strands move towards a higher lay angle and this helps increase the Youngs Modulus of the rope for subsequent use. The application of force to create tension in the sections of rope also helps consolidate the assembly. It may be desirable to also apply dedicated tension, as step prior to tensioning all the sections of rope, to the spliced section so that this section is firstly consolidated.

The application of a lubricant such as Vaseline™ may also be desirable to each or some of the links of rope. The application of a lubricant helps in the performance of the rope once it is under use load conditions. The application of a lubricant to the rope helps reduce the generation of heat in the rope under extreme loads as there is less friction created in the coupling device.

Once the layout of FIGS. 25-27 is established and preferably a pre-tension has been applied, the sections 693A and 693B of the (eg eight) sections of rope may be then be bound together using an adhesive tape such as insulation tape, leaving the sections at the ends proximate to the winding posts un-taped. Such tape 694 brings the section 693A and 693B together yet leaving a first eye 676A and 676B at the end of the flexible elongate member as seen in FIG. 29. The eyes are then able to be loaded onto the first and second annular members respectively as seen in FIGS. 22 and 23. The tape also helps keep water and dirt away from the rope sections below the tape, such as rain water of water from puddles when the coupling is in use.

A further sheath 695A and 695B may be located over the flexible elongate member. This may provide further protection. This sheath may be made from Technora and may be tightly wound or assembled or braided over the rope sections and helps keep the braids of the rope in or close to its pretensioned nature. The sheath 695A and 695B are preferably in situ braided over the flexible elongate member rather than slid over. Additional winding rope 696 may be provided proximate the eyes 676A and 676B to help ensure the eyes are tightly located about their annular members to help prevent the eyes from falling of the annular members.

The present invention allows for a flexible elongate member of multiple sections of rope to be provided that is about 20-25% smaller in diameter to an equivalent break strength of a single section of rope of the same material. This means the connector can be of lighter for more ease of handling. The construction of the flexible elongate member as herein described is also of reduced creep under load when compared to the use of a single section of rope of the same material such as a 12-strand rope. The invention can achieve a Working Safe Load of over 5:1. A coupling for MBS510,000 kg may exhibit only 4% elongation at MBS.

Preferably the amount of total rope used within the flexible elongate member is 50 meters. In one embodiment, the total amount of rope used within the flexible elongate member is greater than 40 meters. In another embodiment, the total amount of rope used within the flexible elongate member may be between 43-48 meters. The closed loop measurement of the coupling device 100, 200 may be less than 1000 mm or less than 750 mm or more than 500 mm.

Figure 11:
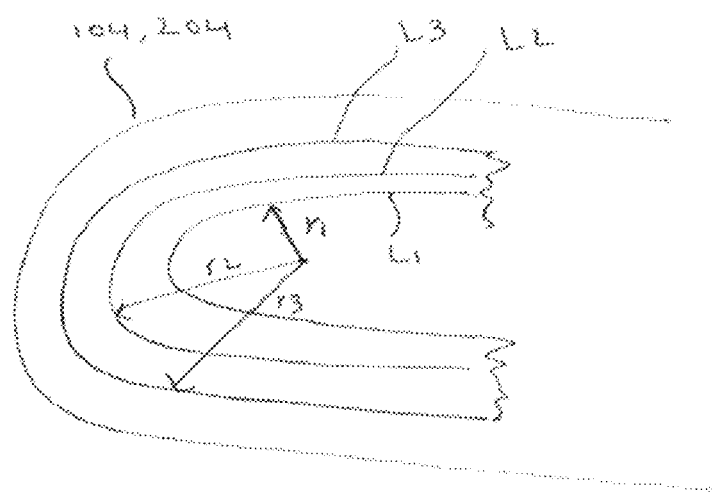
FIG. 11: shows a schematic partial view of a flexible elongate member of the coupling device showing ropes of different lengths and different radius at a bight of the flexible elongate member.

The present invention may also reside in a coupling device that is able to loop through or over an anchor point of machinery to couple to the machinery and apply a force to the machinery, the loop of the coupling device comprising a plurality of non-woven, inter-woven or spliced lengths of rope, each of a different length through the loop. The coupling device may be in a form of a shackle (soft shackle or soft recovery shackle). FIG. 11 shows loop member 104, 204 comprising plurality of ropes of different lengths L1, L2, L3 and different radius r1, r2 and r3. In one embodiment, the loop member may have a total diameter greater than 50 cm. In another embodiment, the loop member 104, 204 may have a total diameter between 52 cm-62 cm. In yet another embodiment, the loop member 104, 204 may have a total diameter of less than 65 cm. In one embodiment, the each of the lengths of rope may have a total diameter between 10 to 15 cm, more preferably between 13 cm to 15 cm.

Some versions of coupling as herein described is able to be used for connection to objects which edges are not smooth or flat and that may have sharp surfaces such as at tow points of the font and rear of most rear dump trucks. Some versions of the coupling do need to avoid being connected at sharp on non-smooth surface.

The coupling may have a high heat resistance. This makes it great for use in coal mines.

Where in the foregoing description reference has been made to elements or integers having known equivalents, then such equivalents are included as if they were individually set forth.

It will of course be realised that while the foregoing description has been given by way of illustrative example(s) of the present invention, all such modifications and variations thereto as would be apparent to a person skilled in the art are deemed to fall within the broad scope and ambit of the various aspects of invention as is hereinbefore described and/or defined in the claims.

The invention claimed is:

1. A coupling device comprising:
   a pin;
   a flexible elongate member in a part loop form completing a loop with the pin, secured to the pin to be able to form at least one smaller loop form using the pin, the at least one smaller loop form with the pin being a coupling form of the coupling device;
   wherein the flexible elongate member (a) comprises at least one length of rope formed to define parallel multiple rope sections of the part loop form, and (b) is at least in part protectively ensheathed using a cover to protect at least part of the rope sections,
   wherein the flexible elongate member is able to be secured to the pin to be able to form the at least one smaller loop form using the pin as a toggle,
   wherein the at least one length of rope is wound into the part loop form by a plurality of windings of the at least one length of rope, and
   wherein the windings are of at least two different sizes.

2. The coupling device as claimed in claim 1 wherein the at least one length of rope consists of one length of rope formed to define parallel multiple rope sections of the length of rope of the elongate member.

3. The coupling device as claimed in claim 1 wherein the at least one length of rope is of an ultra-high molecular weight polyethylene (UHMwPE).

4. The coupling device as claimed in claim 1 wherein the at least one length of rope is made up of ultra-high molecular weight polyethylene (UHMwPE) or a para-aramid high performance fibre.

5. The coupling device as claimed in claim 1 wherein the part loop form is of at least 3 parallel rope sections of the at least one length of rope.

6. The coupling device as claimed in claim 1 wherein the part loop form is of at least 4 parallel rope sections of the at least one length of rope.

7. The coupling device as claimed in claim 1 wherein the part loop form is of at least 6 parallel rope sections of the at least one length of rope.

8. The coupling device as claimed in claim 1 wherein the part loop form is of at least 8 parallel rope sections of the at least one length of rope.

9. The coupling device as claimed in claim 1 wherein the pin comprises a securement means to secure at least a portion of the flexible elongate member that is in contact with the pin.

10. The coupling device as claimed in claim 9 wherein the securement means is in a form of a bracket that is attached to or is integrally formed with the pin.

11. The coupling device as claimed in claim 1 wherein the plurality of windings comprises at least one outer winding and at least one inner winding inwardly of yet abutting and parallel the outer winding.

12. The coupling device as claimed in claim 1 wherein the plurality of windings comprises at least two outer windings and at least two inner windings inwardly of yet abutting and parallel the outer windings.

13. The coupling device as claimed in claim 1 wherein the plurality of windings comprises at least four outer windings and at least four inner windings inwardly of yet abutting and parallel the outer windings.

14. The coupling device as claimed in claim 1 wherein the plurality of comprise at least one outer rope winding and at least one inner rope winding, wherein the at least one outer rope winding has a larger length than the at least one inner rope winding.

\* \* \* \* \*